United States Patent
Kim et al.

(10) Patent No.: US 8,446,541 B2
(45) Date of Patent: May 21, 2013

(54) PORTABLE COMPUTER

(75) Inventors: Hyun Ki Kim, Daegu (KR); Jong Chil Lee, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 12/874,021

(22) Filed: Sep. 1, 2010

(65) Prior Publication Data
US 2011/0134255 A1   Jun. 9, 2011

(30) Foreign Application Priority Data
Dec. 8, 2009   (KR) .................. 10-2009-0120890

(51) Int. Cl.
*G02F 1/1333*   (2006.01)

(52) U.S. Cl.
USPC ............... 349/58; 349/57; 348/148; 348/151

(58) Field of Classification Search
USPC ........... 349/57, 58; 348/148, 151, 207.1, 348/E05.024
See application file for complete search history.

(56) References Cited

U.S. PATENT DOCUMENTS

| | | | |
|---|---|---|---|
| 7,486,347 B2 * | 2/2009 | Kim | 349/58 |
| 7,554,523 B2 * | 6/2009 | Chang et al. | 345/156 |
| 2005/0012101 A1 * | 1/2005 | Kimura | 257/72 |
| 2005/0128422 A1 * | 6/2005 | Lee et al. | 349/187 |
| 2006/0028597 A1 * | 2/2006 | Kitagawa et al. | 349/64 |
| 2007/0002206 A1 * | 1/2007 | Shirai | 349/58 |
| 2008/0012076 A1 * | 1/2008 | Yamazaki et al. | 257/347 |
| 2008/0068462 A1 * | 3/2008 | Koumura | 348/148 |
| 2010/0177259 A1 * | 7/2010 | Ichioka et al. | 349/58 |
| 2010/0279694 A1 * | 11/2010 | Yagi et al. | 455/436 |

FOREIGN PATENT DOCUMENTS

| | | |
|---|---|---|
| CN | 1360252 | 7/2002 |
| CN | 2802569 | * 8/2005 |
| CN | 1693974 | 11/2005 |
| CN | 2802569 | * 8/2006 |

* cited by examiner

*Primary Examiner* — Edward Glick
*Assistant Examiner* — Sang V Nguyen
(74) *Attorney, Agent, or Firm* — McKenna Long & Aldridge, LLP

(57) ABSTRACT

Disclosed is a portable computer that includes: a receiving portion configured to receive a liquid crystal display panel, and a light guide plate; optical sheets; a screen case combined with edges of a liquid crystal display module which includes the liquid crystal display panel, the light guide plate, the optical sheets, and the receiving portion; and a camera disposed at the center of an edge of the screen case which is combined with the liquid crystal display module. The camera is inserted into a hole, which is formed to penetrate through the screen case and liquid crystal display module, and is combined with the screen case.

9 Claims, 2 Drawing Sheets

PORTABLE COMPUTER

CROSS-REFERENCE TO RELATED APPLICATION

This application claims priority under 35 U.S.C. 119 to Korean Patent Application No. 10-2009-0120890, filed on Dec. 8, 2009, which is hereby incorporated by reference in its entirety.

BACKGROUND

1. Field of the Disclosure

This disclosure relates to a portable computer, and more particularly a portable computer adapted to reduce a size.

2. Description of the Related Art

In general, LCD devices corresponding to a flat display device have a variety of features such as superior visibility, less power consumption than cathode ray tubes with the same-sized screen, or others. In addition, LCD devices can be manufactured to have light weigh and small size. As such, LCD devices have been highlighted as a next generation display device to be used for monitors of cellular phones, computers, televisions, or others.

Actually, the LCD devices are being applied as screen devices of portable computers. The portable computers are configured to include an LCD module pivotably mounted about a main system or a main set, in order to be easily carried. Moreover, the portable computers are mainly manufactured in a notebook shape with a camera which is disposed on a rim surface adjacent to the top edge of a display area used to display images.

More specifically, the LCD module used in the portable computer includes an LCD panel, a backlight unit, and a driving circuit unit. Such an LCD module is combined with the screen device of the portable computer in such a manner as to be received into a screen case of the screen device. On the other hand, the camera used in the portable computer is inserted into a hole which is formed in an inner rim of the screen case.

In other words, the screen device of the portable computer must be configured to include an inner rim wide enough to form the hole for receiving the camera. As such, the size of the screen device becomes larger, and furthermore the weight of the portable computer increases. Due to this, it is very difficult to carry the portable computer with a user.

BRIEF SUMMARY

Accordingly, the present embodiments are directed to a portable computer that substantially obviates one or more of problems due to the limitations and disadvantages of the related art.

An object of the present embodiment is to provide a portable computer that is adapted to decrease size and weight by reducing the size of a screen case combined with an LCD module and a camera.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a portable computer includes: a liquid crystal display panel configured to include a first substrate which includes gate and data lines arranged to define pixels, a second substrate which is opposite the first substrate and includes color filters used for implementing a variety of colors and a black matrix, and a liquid crystal layer interposed between the two substrates; a light source configured to emit light; a light guide plate configured to guide light emitted from the light source toward the liquid crystal display panel; optical sheets disposed on the light guide plate and configured to enhance optical characteristics of light; a receiving portion configured to receive the liquid crystal display panel, the light guide plate. The optical sheets: a screen case combined with edges of a liquid crystal display module which includes the liquid crystal display panel, the light guide plate, the optical sheets, and the receiving portion; and a camera disposed at the center of an edge of the screen case which is combined with the liquid crystal display module. Also, wherein the camera is inserted into a hole, which is formed to penetrate through the screen case and liquid crystal display module, and is combined with the screen case.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
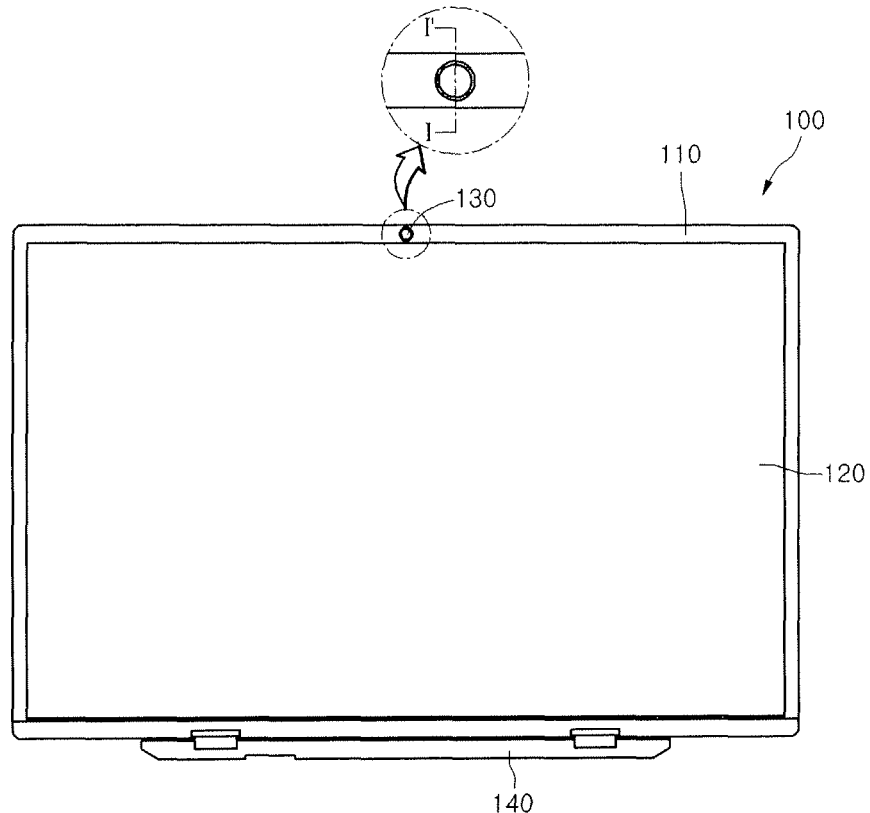
FIG. 1 is a front view showing an unfolded portable computer according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a planar view showing a portable computer according to an embodiment of the present disclosure. Referring to FIG. 1, the portable computer 100 according to the present disclosure includes an LCD module 120, a screen case 110 configured to encompass edges and rear surface of the LCD 120, and a part of a main body (hereinafter, "main body") 140 combined with the screen case 110 and configured to support the LCD module 120. The portable computer 100 further includes a camera 130 positioned at the center of a top edge of the LCD module 120 which is covered with an inner rim of the screen case 110.

The LCD module 120 includes an LCD panel configured to display images and to include gate and data lines which are arranged to define pixels, a driving circuit configured to drive the LCD panel, and a backlight unit configured to irradiate light to the LCD panel. Also, the LCD module 120 includes at least one packing member used to combine the LCD panel with the backlight unit.

The screen case 110 is formed from a plastic material and combined with the LCD module 120 in such a manner as to encompass the LCD module 120. Also, the screen case 110 is pivotably mounted about the main body 140. Such a screen case 110 combined with the LCD module 120 can be distributed as an independent monitor for the portable computer.

The camera 130 includes a charge coupled device (CCD) and a control circuit configured to control the CCD. The control circuit allows the CCD to continuously take images of an object. In other words, a video camera with the CCD can be used as a camera 130 of the portable computer.

Figure 2:
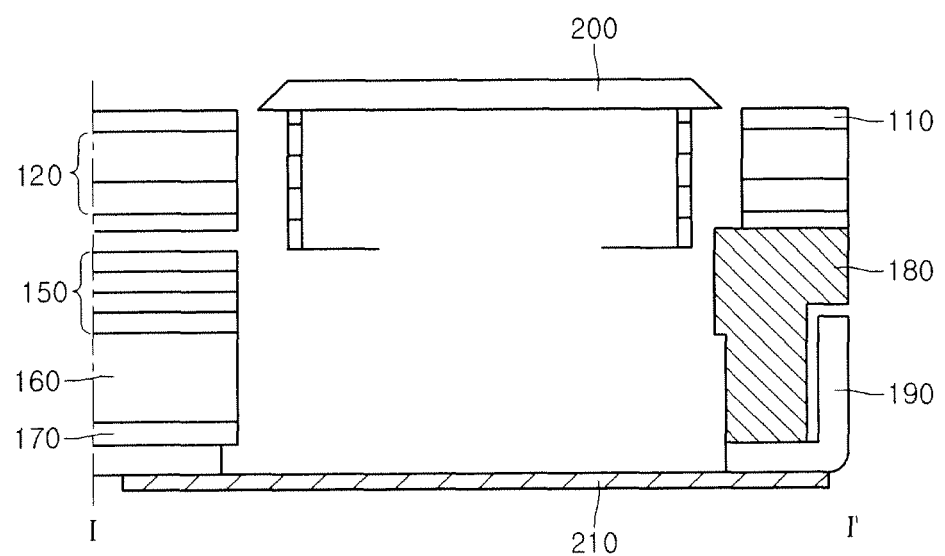
FIG. 2 is a cross-sectional view showing the screen device taken along a line I-I' in FIG. 1.
Figure 3:
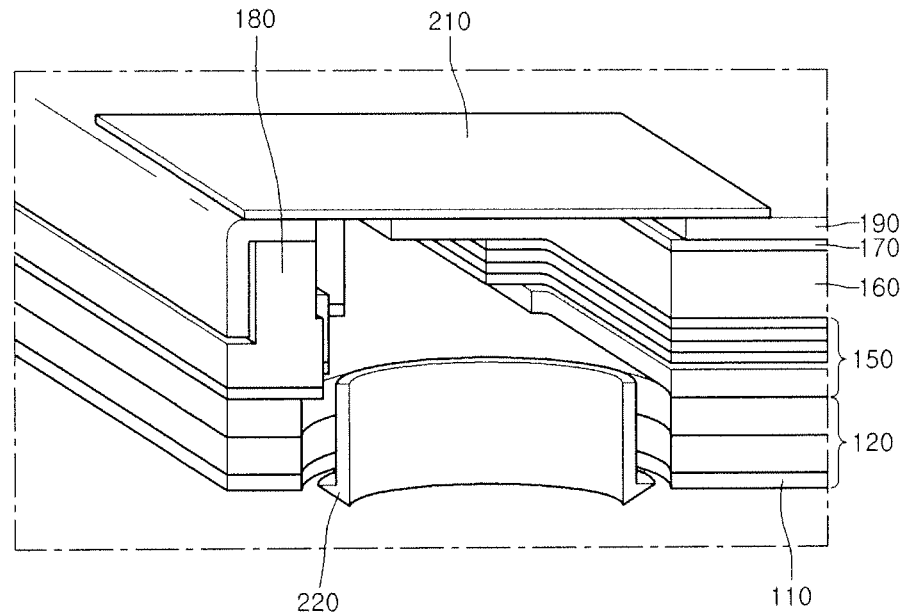
FIG. 3 is a perspective view showing a part of the screen device shown in FIG. 2.
Figure 4:
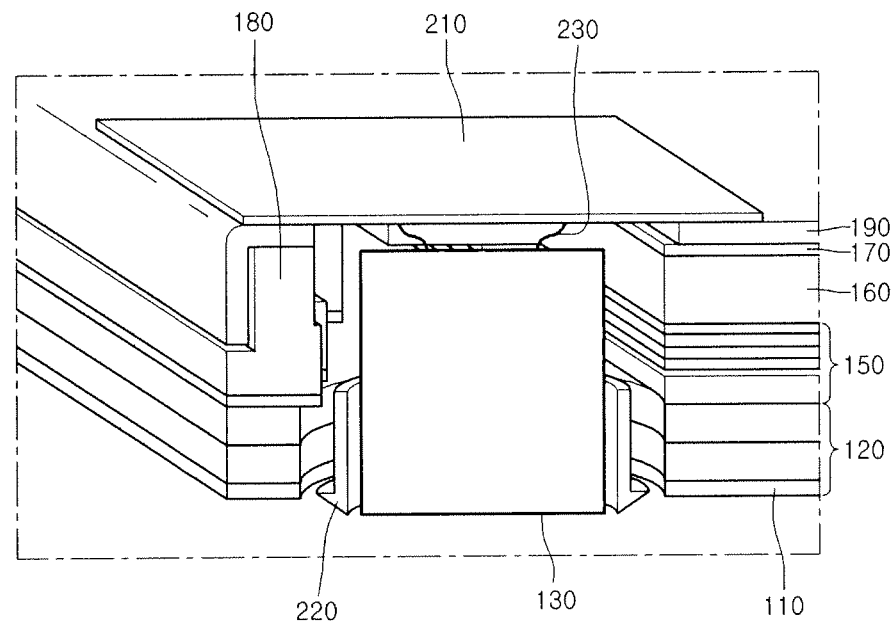
FIG. 4 is a perspective view showing a combined state in which a camera is inserted into a through hole of the screen device shown in FIG. 3.

FIG. 2 is a cross-sectional view showing the screen device taken along a line I-I' in FIG. 1. FIG. 3 is a perspective view showing a part of the screen device shown in FIG. 2. FIG. 4 is a perspective view showing a combined state in which a camera is inserted into a through hole of the screen device shown in FIG. 3.

As shown in FIGS. 1 through 4, the portable computer 100 includes an LCD panel 122 configured to include two glass substrates, optical sheets 150 configured to enhance optical characteristics of light emitted from a light source (not shown), a light guide plate 160 configured to guide light from the light source to the optical sheets, and a reflection sheet 170 configured to reflect a portion of light progressing downwardly from the light guide plate 160 among the light emitted in the light source, toward the light guide plate 160 (more specifically, toward the optical sheets 150).

Also, the portable computer 100 includes a mold frame 180 configured to support the LCD panel 122, and a bottom cover 190 configured to receive the mold frame 180, optical frame 150, light guide plate 160, and reflection sheet 170. The optical sheet 150, light guide plate 160, and reflection sheet 170 stacked inside the bottom cover 190 form a backlight unit. The backlight unit, the LCD panel 122, and mold frame 180 form the LCD module 120.

The portable computer 100 further includes the screen case 110 configured to encompass the edges and rear surface of the LCD module 120, a hole formed to be passed by the camera (130 in FIG. 1), a protective film 200 configured to protect a lens of the camera 130 inserted to the through hole, and a fixing piece 210 configured to fasten the camera 130 which is inserted to the through hole, to the bottom cover 190. The fixing piece 210 used to stably position the camera 130 inside the through hole can include signal line patterns 230 formed to transfer driving signals from a camera driver (not shown), which is disposed in the exterior, to the camera 130.

The LCD panel 122 includes a liquid crystal layer interposed between a thin film transistor array substrate and a color filter substrate. The thin film transistor array substrate includes gate lines arranged at a fixed interval in a vertical direction and data lines arranged at the fixed interval in a horizontal direction. The gate lines and data lines cross each other and define pixels. The pixels are arranged in a matrix shape on the thin film transistor array substrate. On the other hand, the color filter substrate includes red, green, and blue color filters formed on regions opposite to the respective pixels, and a black matrix formed to rim each of the color filters and configured to prevent interference between color lights which pass through the color filters. The color filter substrate further includes a common electrode formed on the color filters and black matrix. The common electrode together with pixel electrodes of the thin film transistor array substrate induces an electric field to be applied to the liquid crystal layer.

The two substrates are formed to each have a hole suitable to be passed by the camera 130. The holes can be formed by cutting off parts of the substrates using a laser beam. Alternatively, the holes can be formed by removing parts of the substrates through an etching process.

The optical sheets 150 are stacked on the light output surface of the light guide plate 160, in order to enhance optical characteristics of the light which is output from the light output surface of the light guide plate 160. To this end, the optical sheets 150 are configured to include a diffusion sheet, a prism sheet, and a protective sheet.

The diffusion sheet is disposed on the light output surface of the light guide plate 160, and configured to scatter incident light from the light output surface of the light guide plate 160. The prism sheet is disposed on the diffusion sheet and configured to converge light scattered by the diffusion sheet, thereby improving brightness in a frontward direction. The protective sheet is disposed on the prism sheet and used for preventing stain defects which are brightly displayed due to the prism sheet.

Such optical sheets 150 are configured to each include a hole formed in the same manner as those of the two substrates of the LCD panel 122 and in a shape suitable to be passed by the camera 130. The holes can be formed in the optical sheet 150 using a wooden cast which is employed in the manufacture of the optical sheets 150.

The light guide plate 160 is formed from one plastic material, such as polymethylmethacrylate (PMMA) or others, and resin materials. Also, the light guide plate 160 is formed in a flat surface shape. Moreover, the light guide plate 160 is configured to include a hole formed opposite those of the optical sheets 150 and LCD panel 122 (i.e., the holes formed in the optical sheets 150 and LCD panel 122). The hole can be formed by injection-molding the light guide plate 160 using a mold with a hole forming member.

The holes formed in the LCD panel 122, optical sheets 150, and light guide plate 160 are configured to occupy the same region and to entirely overlap one another. Also, the holes are positioned at the center of one edge of the LCD module 120 opposite to a light incident portion. In other words, the holes are configured to form a through hole suitable to receive the camera 130. Therefore, the camera 130 can be fastened to the LCD module 120 in such a manner as to be inserted into the through hole.

Furthermore, the portable computer 100 can include a fixing guider 220 configured to be inserted into the through hole and used to guide the position of the camera 130, as shown in FIG. 3. The fixing guider 220 is formed in a cylinder shape suitable to be inserted into the through hole and to closely contact the side surface of the through hole. As such, the fixing guider 220 is positioned within the through hole and used for guiding the camera 130 to be inserted and fastened to a desired position within the through hole.

The camera 130 inserted into the through hole, which is provided by the holes formed in the edges of the LCD panel 122, optical sheets 150 and light guide plate 160, is electrically connected to the signal line patterns 230 on the fixing piece 210. The signal line patterns 230 transfer the driving signals from the camera driver disposed at the exterior to the camera 130, thereby allowing the camera 130 to be driven.

An inner rim of the screen case 110 combined with edges of the LCD module 120 is configured to include a hole formed opposite the holes which are formed on the two substrate of the LCD panel 122, the optical sheets 150, and the light guide plate 160. As such, the camera 130 placed within the through hole is exposed to users through the hole formed in the inner rim of the screen case 110.

In this manner, the portable computer 100 according to the present disclosure forces a through hole penetrating through the same position of the edges of the two substrates of the LCD panel 122, optical sheets 150, light guide plate 160, and screen case 110 to be formed. Also, the portable computer 100 allows the camera 130 to be inserted into the through hole. As such, the screen device of the portable computer according to the present disclosure can be reduced to a smaller size than that of the related art portable computer of which the rim of the screen case is configured to include a hole used for receiving the camera 130.

As described above, the smaller the size of the screen case 110, the more the entire size and weight of the portable computer with the LCD module 120 can decrease. Therefore, the portable computer according the present disclosure can minimize uncomfortable feeling which is caused for the user due to the large size and weight.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable computer comprising:
    a liquid crystal display panel configured to include a first substrate which includes gate and data lines arranged to define pixels, a second substrate which is opposite the first substrate and includes color filters used for implementing a variety of colors and a black matrix, and a liquid crystal layer interposed between the two substrates;
    a light source configured to emit light;
    a light guide plate configured to guide light emitted from the light source toward the liquid crystal display panel;
    optical sheets disposed on the light guide plate and configured to enhance optical characteristics of light;
    a bottom cover configured to receive the liquid crystal display panel, the light guide plate, and the optical sheets;
    a screen case disposed at edges of a liquid crystal display module which includes the liquid crystal display panel, the light guide plate, the optical sheets, and the bottom cover; and
    a camera disposed at the center of an edge of the screen case,
    wherein the camera is inserted into a hole, which is formed to penetrate through the screen case and liquid crystal display module, and is combined with the screen case, and
    wherein the hole is formed to penetrate through the first and second substrates included in the liquid crystal display panel.

2. The portable computer claimed as claim 1, wherein the first and second substrates are provided with the hole by irradiating a laser beam.

3. The portable computer claimed as claim 1, wherein the first and second substrates are provided with the hole through an etching process.

4. The portable computer claimed as claim 1, wherein the hole is formed to penetrate through the light guide plate.

5. The portable computer claimed as claim 1, wherein the hole is formed to penetrate through the optical sheets.

6. The portable computer claimed as claim 1, further comprising a fixing piece is disposed on the rear surface of the receiving portion and configured to stably fasten the camera to the bottom cover.

7. The portable computer claimed as claim 6, wherein the fixing piece includes signal line patterns electrically connected to the camera and configured to transfer driving signals to the camera.

8. The portable computer claimed as claim 1, further comprising a fixing guider configured to guide the camera at a desired position within the hole.

9. The portable computer claimed as claim 8, wherein the fixing guider is formed in a cylinder shape which brings in close contact with the side surface of the hole.

* * * * *